(12) United States Patent
Christensen et al.

(10) Patent No.: US 8,887,510 B2
(45) Date of Patent: Nov. 18, 2014

(54) HEAT INTEGRATION IN $CO_2$ CAPTURE

(75) Inventors: Tor Christensen, Sandefjord (NO); Hermann De Meyer, Brasschaat (BE)

(73) Assignee: Sargas AS, Oslo (NO)

( * ) Notice: Subject to any disclaimer, the term of this patent is extended or adjusted under 35 U.S.C. 154(b) by 28 days.

(21) Appl. No.: 13/881,979

(22) PCT Filed: Oct. 17, 2011

(86) PCT No.: PCT/EP2011/068055
§ 371 (c)(1),
(2), (4) Date: Apr. 26, 2013

(87) PCT Pub. No.: WO2012/055715
PCT Pub. Date: May 3, 2012

(65) Prior Publication Data
US 2013/0205796 A1      Aug. 15, 2013

(30) Foreign Application Priority Data

Oct. 28, 2010   (NO) .................................. 20101517

(51) Int. Cl.
*F02C 1/00*          (2006.01)
(Continued)

(52) U.S. Cl.
CPC ............ *F01N 3/00* (2013.01); *B01D 2251/306* (2013.01); *F01K 23/10* (2013.01);
(Continued)

(58) Field of Classification Search
USPC ........ 60/772, 39.12, 39.182, 39.52, 782, 783, 60/266, 267; 166/272.3
See application file for complete search history.

(56) References Cited

U.S. PATENT DOCUMENTS 6,274,108 B1   8/2001   Fujii et al.

| | | | |
|---|---|---|---|
| 8,701,764 B2 * | 4/2014 | Borseth et al. | 166/272.3 |
| 2013/0119667 A1 * | 5/2013 | Christensen et al. | 290/52 |

FOREIGN PATENT DOCUMENTS

| | | | |
|---|---|---|---|
| WO | WO-2004/001301 A2 | 12/2003 | |
| WO | WO-2006/107209 A1 | 10/2006 | |

(Continued)

OTHER PUBLICATIONS

Henkes, Roeland, "International Search Report" for PCT/EP2011/068055, as mailed May 15, 2012, 4 pages.

Primary Examiner — Craig Kim
(74) Attorney, Agent, or Firm — Winstead PC

(57) ABSTRACT

A power plant for combustion of carbonaceous fuels with $CO_2$ capture, comprising a pressurized fluidized bed combustion chamber (2), heat pipes (8, 8') for cooling of the combustion gas in the combustion, a direct contact cooler (15), a cleaned exhaust pipe (18) for withdrawal of the exhaust gas from the direct contact cooler (15) and introduction of the cooled exhaust gas into a $CO_2$ absorber (19), where a lean exhaust pipe (20) is connected to the top of the absorber (19) for withdrawal of lean exhaust gas from the absorber (20), and a rich absorbent pipe (30) is connected to the bottom of the absorber (19) for withdrawal of rich absorbent and introduction of the rich absorbent into a stripping column (32) for regeneration of the absorbent to give a lean absorbent and a $CO_2$ stream that is further treated to give clean $CO_2$, where a water recirculation pipe (16) is connected to the bottom of the direct contact cooler (15) for withdrawal of used cooling water and connected to the top of the direct contact cooler(15) reintroduction of the cooling water at the top of the direct contact cooler, wherein a heat exchanger (17) connected to water recycle pipes (70, 70') for delivery and withdrawal, respectively, of cooling water to the heat exchanger, is provided in the recirculation pipe (16) for cooling the circulating direct contact cooler cooling water in pipe (16).

2 Claims, 5 Drawing Sheets

(51) Int. Cl.
*F01K 23/10* (2006.01)
*B01D 53/14* (2006.01)
*F22B 1/18* (2006.01)
*F01K 13/00* (2006.01)
*B01D 53/62* (2006.01)
*F01N 3/00* (2006.01)

(52) U.S. Cl.
CPC ..... *B01D 53/1418* (2013.01); *B01D 2257/404* (2013.01); *F22B 1/1815* (2013.01); *B01D 53/1475* (2013.01); *B01D 2257/504* (2013.01); *F01K 13/00* (2013.01); *B01D 53/62* (2013.01); *Y02C 10/04* (2013.01); *B01D 2251/606* (2013.01); *Y02C 10/06* (2013.01)

USPC ........ 60/772; 60/39.12; 60/39.182; 60/39.52; 60/782; 60/783; 166/272.3

(56) References Cited

FOREIGN PATENT DOCUMENTS

| WO | WO-2009035340 A1 | | 3/2009 |
|---|---|---|---|
| WO | WO-2010/020684 A1 | | 2/2010 |
| WO | WO 2010020684 A1 | * | 2/2010 |
| WO | WO-2010110939 A1 | | 9/2010 |
| WO | WO-2012/013596 A1 | | 2/2012 |

* cited by examiner

HEAT INTEGRATION IN $CO_2$ CAPTURE

TECHNICAL FIELD

The present invention relates to the field of $CO_2$ capture from $CO_2$ containing gases, such as exhaust gases from combustion of carbonaceous fuels. More specifically, the invention relates to improvements to $CO_2$ capture for reduction of energy requirement for a plant for $CO_2$ capture.

BACKGROUND ART

The release of $CO_2$ from combustion of carbonaceous fuels, and most specifically fossil fuels is of great concern due to the greenhouse effect of $CO_2$ in the atmosphere. One approach to obtain reduction of $CO_2$ emission into the atmosphere is $CO_2$ capture from the exhaust gases from combustion of carbonaceous fuels and safe deposition of the captured $CO_2$. The last decade or so a plurality of solutions for $CO_2$ capture have been suggested.

The technologies proposed for $CO_2$ capture may be categorized in three main groups:
1. $CO_2$ absorption—where $CO_2$ is reversibly absorbed from the exhaust gas to leave a $CO_2$ lean exhaust gas and the absorbent is regenerated to give $CO_2$ that is treated further and deposited.
2. Fuel conversion—where hydrocarbon fuels are converted (reformed) to hydrogen and $CO_2$. $CO_2$ is separated from the hydrogen and deposited safely whereas the hydrogen is used as fuel.
3. Oxyfuel—where the carbonaceous fuel is combusted in the presence of oxygen that has been separated from air. Substituting oxygen for air leaves an exhaust gas mainly comprising $CO_2$ and steam which may be separated by cooling and flashing.

WO 2004/001301 A (SARGAS AS) 31 Dec. 2003, describes a plant where carbonaceous fuel is combusted under an elevated pressure, where the combustion gases are cooled inside the combustion chamber by generation of steam in steam tubes in the combustion chamber, and where $CO_2$ is separated from the combustion gas by absorption/desorption to give a lean combustion gas and $CO_2$ for deposition, and where the lean combustion gas thereafter is expanded over a gas turbine.

WO 2006/107209 A (SARGAS AS) 12 Oct 2006 describes a coal fired pressurized fluidized bed combustion plant including improvements in the fuel injection and exhaust gas pre-treatment.

Combustion of the carbonaceous fuel under elevated pressure and cooling of the pressurized combustion gases from the combustion chamber reduces the volume of the flue gas, relative to similar amounts of flue gas at atmospheric pressure. Additionally, the elevated pressure and cooling of the combustion process makes a substantially stoichiometric combustion possible. A substantially stoichiometric combustion giving a residual content of oxygen of <5% by volume, such as <4% by volume or <3% by volume, reduces the mass flow of air required for a specified power production. The elevated pressure in combination with the reduced mass flow of air results in a substantial reduction of the total volume of the exhaust gas to be treated. Additionally, this result in substantial increase in the concentration and partial pressure of $CO_2$ in the flue gas, greatly simplifying the apparatus and reducing the energy required to capture $CO_2$.

All methods and processes for $CO_2$ capture are energy consuming. Substantial effort has therefore been put into development of less energy consuming methods and processes to reduce the loss of energy, often in the form of steam at relatively low temperature and pressure, and cooling water. Many approaches have been made to heat integrate several process steps to ascertain that heat produced at one stage is transferred to a heat demanding process. The goal for these approaches are to get more energy efficient methods, processes and plants for production of electrical power from carbonaceous fuels at the same time as $CO_2$ is captured.

There is, however, still a huge demand for solutions improving the energy efficiency of power plants including $CO_2$ capture. The aim of the present invention is to provide novel an improved solutions for heat integration for increasing the energy efficiency, i.e. maximise the output of useful energy as heat and/or electricity of a given amount of chemical energy as carbonaceous fuel.

SUMMARY OF INVENTION

To be inserted when the claims are agreed upon.

DETAILED DESCRIPTION OF THE INVENTION

Figure 1:
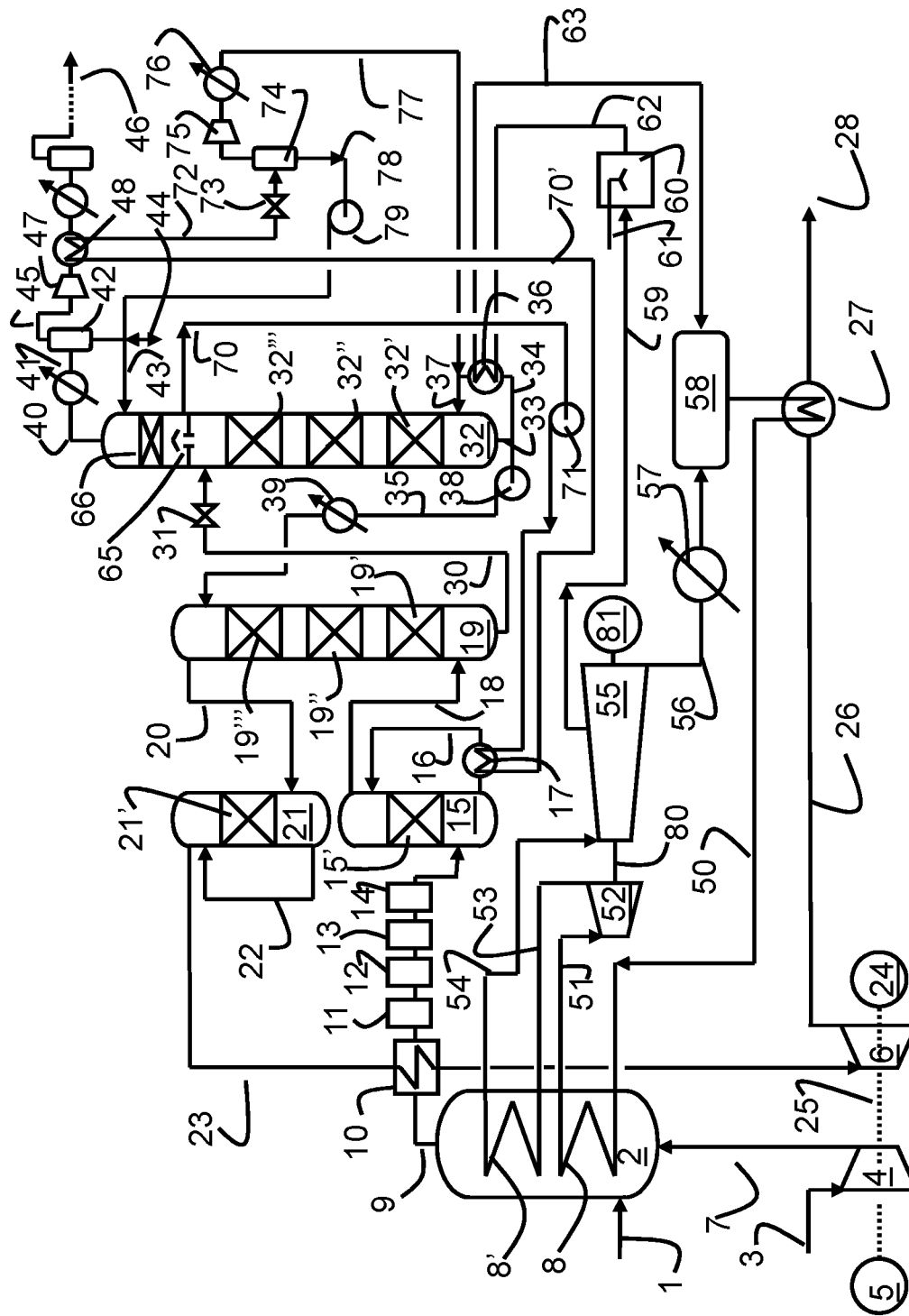
FIG. 1 is a principle drawing of a first embodiment of the invention.

FIG. 1 is an illustration of a plant according to the present invention. Fuel which contains carbon, herein also referred to as carbonaceous fuel, is introduced through a fuel pipe 1 into a pressurized combustion chamber 2 at a pressure from 5 to 50 bar gauge, hereinafter abbreviated as barg. The pressure in the combustion chamber is preferably above 10 barg, such as e.g about 15 barg.

The fuel may be natural gas, oil, coal, biofuel or any other carbon rich fuel and the way of introduction and firing of the fuel is dependent on the type of fuel as is well known by the skilled man in the art.

Air or a gas containing oxygen is introduced through an air intake 3 into a compressor 4. The compressor 4 is driven by a motor 5 or a gas turbine 6 via a common shaft 25 as will be further described below. The skilled man will understand that the compressor 4 may be a representation for one or more compressors or compressor stages connected in series, optionally with intercoolers between the individual compressors or compressor steps. Parallel compressors may be employed for very large systems.

The air or gas containing oxygen from compressor 4 is led through a compressed air pipe 7 into the combustion chamber 2 as a source for oxygen for the combustion in the combustion chamber. The air and fuel introduced into the combustion chamber are controlled to give residual oxygen content in the exhaust gas lower than 5% by volume, such as lower than 4% by volume or lower than 3% by volume. Low residual oxygen content results in a flue gas with high $CO_2$ content. Accordingly, the $CO_2$ content in the exhaust gas is from about 8% to about 18% by volume when air is used and the values for residual oxygen are as indicated.

Heat pipes 8, 8' are arranged inside the combustion chamber to cool the combustion gases by generation of steam and superheated steam inside the heat pipes 8, 8', respectively. The combustion gases are cooled by the heat pipes 8, 8' so that the exit temperature of the exhaust gas is 300 to 900 deg C.

Dependent on the intended fuel, the internal arrangement in the combustion chamber may differ. When using coal as fuel air is introduced to give a fluidized bed of fuel for the combustion and the heat pipes 8, 8' are arranged in the fluidized bed. When using oil or gas as fuel, two or more stages of oil burners or gas burners, respectively, are arranged in the combustion chamber and the heat pipes 8, 8' are arranged between the stages to cool the combustion gases between each stage. The skilled will also understand that it is possible to use combination of the mentioned fuels or other carbon rich fuels.

The above identified WO 2004001301 and WO 2006107209 describe examples of configurations for different fuels.

Exhaust gas is withdrawn from the combustion chamber through an exhaust gas pipe 9 and is cooled in a heat exchanger 10 to a temperature between 250 and 450 deg C.

One or more units for exhaust gas pre-treatment is/are arranged downstream of the heat exchanger 10. Preferably, a filter unit 11 is arranged immediately downstream to the heat exchanger 10 to remove particles from the combustion gas. The filter unit may be omitted for exhaust gas having low particle content, such as exhaust gas from combustion of oil or gas as fuel. The filter unit is, however, obligatory when using coal as coal gives rise to particles that may be detrimental for steps downstream of the gas treatment unit.

Combustion of carbonaceous fuel in the presence of air generates NOx. Besides its environmental effects, NOx may also be detrimental to the $CO_2$ capture. A Selective Catalytic Reduction (SCR) unit 12 is therefore arranged downstream of the heat exchanger 10 and the optional filter unit 11. Urea or $NH_3$ is introduced into the SCR unit and reacted with NOx over a catalyst for removal of NOx according to well known technology. The temperature in the SCR unit is preferably between 250 and 450 deg C. Preferred operation temperature for a SCR unit is about 350 deg C.

Downstream of the SCR unit one or more heat exchangers and scrubbing units are arranged. The first heat exchanger 13 is a flue gas cooling unit for cooling of the exhaust gas to below 250 deg C. The second illustrated unit 14 may be a co-current scrubber. Depending on gas composition and operating conditions, the scrubber may also contribute to the cooling of the gas.

Downstream for the cooling units 13, 14 a counter-current scrubber or direct contact cooler 15 is arranged. Cooling water is introduced through recirculation pipe 16 into the cooler 15 above a contact zone 15' and brought in counter-current flow to exhaust gas that is introduced into the cooler 15 below the contact zone. Water is collected at the bottom of the cooler 15, cooled in a heat exchanger 17 and recycled through the recirculation pipe 16.

The units 11, 12, 13, 14, and 15 may collectively be referred to as pre-treatment units as their purpose is to prepare the exhaust gas for $CO_2$ capture.

Cooled exhaust gas is withdrawn from the cooler 15 through a cleaned exhaust gas line 18 and is introduced into the lower part of an absorber column 19 where the exhaust gas is brought in counter-current flow with an absorbent in one or more contact zone(s) 19', 19", 19''' inside the absorber. The absorbent, a fluid which captures $CO_2$ and may subsequently be regenerated by applying low $CO_2$ partial pressure in the gas phase, relative to the partial pressure of $CO_2$ immediately above the fluid surface, is introduced into the absorber above the upper contact zone through a lean absorbent line 35.

$CO_2$ in the exhaust gas is absorbed by the absorbent inside the absorber to give a $CO_2$ laden, or rich, absorbent that is withdrawn form the bottom of the absorber through a rich absorbent line 30. A lean exhaust gas, from which more than 80%, more preferred more than 95%, of the $CO_2$ in the exhaust gas introduced into the absorber is removed, is withdrawn through a lean exhaust gas line 20.

The pressure in the absorber is slightly lower than the pressure in the combustion chamber, such as 0.5 to 1 bar lower than the pressure in the combustion chamber, which corresponds to a pressure in the absorber from 4.0 to 49.5 barg.

The combination of high pressure and high $CO_2$ content of the exhaust gas introduced into the absorber makes it possible to reduce the volume of the absorber and the volume of circulating absorbent at the same time as high efficiency $CO_2$ capture is obtained.

The absorbent used in the absorber is preferably based on a hot aqueous potassium carbonate solution. Preferably the absorbent comprises from 15 to 35% by weight of $K_2CO_3$ dissolved in water.

In hot potassium carbonate systems $CO_2$ is absorbed according to the following overall equation:

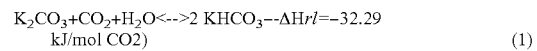

$$K_2CO_3 + CO_2 + H_2O \longleftrightarrow 2\ KHCO_3 \quad -\Delta Hrl = -32.29\ kJ/mol\ CO_2 \quad (1)$$

Lean exhaust gas is withdrawn at the top of the absorber 19 through a lean exhaust gas line and is introduced into a washing section 21 where the lean exhaust gas is brought in counter-current flow against washing water in a contact section 21'. Washing water collected at the bottom of the washing section through a washing water recycle line 22 and is re-introduced into the washing section above the contact section 21'. Washed lean exhaust gas is withdrawn from the top of the washing section through a treated exhaust pipe 23.

The gas in the treated exhaust pipe 23 is introduced into the heat exchanger 10 where the treated exhaust gas is heated against the hot, untreated exhaust gas leaving the combustion chamber 2.

The thus heated and treated exhaust gas is then introduced into a gas turbine 6 where the gas is expanded to produce electrical power in a generator 24. Expanded gas is withdrawn through an expanded exhaust gas pipe 26 which is cooled in a heat exchanger 27 before the as is released into the atmosphere through exhaust gas exit 28.

The compressor 4 and gas turbine 6 may be arranged on a common shaft 25 so that the compressor 4 is at least partly operated by the rotational energy from the gas turbine 6. It is, however, presently preferred that the compressor is operated by the electrical motor 5, and that the gas turbine operates the generator 24 to provide electrical power. Separation of the compressor 4 and gas turbine 6 gives more flexibility in the operation of the plant.

Rich absorbent, i.e. absorbent laden with $CO_2$ is collected at the bottom of the absorber 19 and is withdrawn there from through a rich absorbent pipe 30. The rich absorbent in pipe 30 is flashed over a flash valve 31 to a pressure slightly above 1 to bar absolute, such as 1.2 bar absolute, hereinafter abbreviated bara, before being introduced into a stripping column 32. In line 30, not shown in FIG. 1, there may be a flash tank or stripping unit to remove unwanted volatile components absorbed from the flue gas into the absorbent, such as oxygen.

One or more contact section(s) 32', 32", 32''' is/are arranged in the stripping column 32. The rich absorbent is introduced above the upper contact section of the stripper, and counter-current to vapour introduced below the lowest contact section. Low partial pressure of $CO_2$ in the stripper, which is the result of lower pressure and dilution of $CO_2$ in the stripper, causes the equilibrium in the equation (1) above to be shifted towards left and $CO_2$ to be released from the absorbent.

Lean absorbent is collected at the bottom of the stripping column 32 and is withdrawn through a lean absorbent pipe 33. The lean absorbent pipe 33 is split in two, a first lean absorbent reboiler pipe 34 that is heated in a reboiler 36 to create evaporation from the liquid which is introduced as stripping gas into the stripping column through a steam line 37, and a lean absorbent recycle line 35 in which lean absorbent is pumped back into the absorber 19. A pump 38 and a cooler 39 are provided in line 35 to pump and thus increase the pressure of the absorbent, and to cool the absorbent, respectively, before the absorbent is introduced into the absorber.

$CO_2$ and steam are collected at the top of the stripping column through a $CO_2$ withdrawal pipe 40. A desorber direct contact cooler 66 is arranged above the contact zones 32', 32'', 32''' and above the point where the rich absorbent is introduced into the stripper column 32 through pipe 30 to cool the vapour and $CO_2$ gas mixture leaving the upper contact zone. Cooling fluid is introduced above the direct contact cooler section and allowed to flow through the direct contact cooler section 66. A collector plate 65 is arranged below the direct cooler contact section to allow vapour to pass through on the way upwards in the stripping column 32, and to prevent the cooling fluid from flowing into the contact zones 32', 32'', 32'''. Fluid collected at the collector plate 65 is withdrawn through a water recycle pipe 70 and used as described below.

The vapour in pipe 40 is cooled in a cooler 41 and introduced into a flash tank 42. Liquid formed by cooling in cooler 41 is collected in the bottom of the flash tank 42 through a liquid return pipe 43 and is introduced into the stripping column 32. Alternatively, not shown in FIG. 1, the liquid may be routed to the top of the absorber column 19. A liquid balance pipe 44 may be provided to add liquid to pipe 43, or remove liquid from pipe 43 to balance the circulating amount of water.

The gaseous phase in the flash tank 42 is withdrawn trough a $CO_2$ withdrawal pipe 45, is compressed by means of a compressor 47 and is cooled in a heat exchanger 48 before the gas is further treated to give dry and compressed $CO_2$ that is exported through a $CO_2$ export pipe 46.

The cooling fluid collected at the collector plate 65 and withdrawn through pipe 70, is introduced into the above mentioned heat exchanger 17 to cool the recycling cooling water in recirculation pipe 16. A pump 71 could be arranged preferably in line 70 to circulate the water. As will be described later, the heated fluid is withdrawn from heat exchanger 17 through a pipe 70' and is introduced into the above identified heat exchanger 48 to be further heated against compressed $CO_2$ and steam therein. Further heated fluid is then withdrawn from the heat exchanger 48 through a water pipe 72, is flashed over a flash valve 73 before the flashed fluid is introduced into a flash tank 74 to give water that is collected at the bottom thereof, and vapour that is collected at the top of the flash tank 74 and is withdrawn through a vapour pipe 77. A compressor 75 is arranged in the vapour pipe 77, followed by an optional trim cooler 76. The vapour in vapour line 77 is then introduced as stripping vapour through line 37 into the stripping column 32. Not shown in FIG. 1, the fluid in line 70 may be routed directly to flash valve 73, or may be heated in low temperature energy sources additional to or other than heat exchangers 17 and 48. Examples of such heat sources are scrubber 14, compressor 4 intercoolers, or residual heat in lines 26 and/or 28. More heat reduces power requirements in compressor 75 and may increase the overall system thermal efficiency.

The liquid from flash tank 74 is withdrawn through line 78 and introduced as washing liquid into the stripping column direct contact cooler through pipe 43. A pump 79 is preferably arranged in line 78 to provide sufficient pressure therefore.

Cooling water for the combustion chamber is introduced into the heat pipe 8 from a water pipe 50. Steam generated in the heat pipe 8 is withdrawn through a steam pipe 51 and is expanded over a high pressure steam turbine 52. The steam from the high pressure turbine section is introduced through line 53 into the steam reheater 8' and the resulting steam is withdrawn through steam pipe 54. The superheated steam in pipe 54 is expanded over the intermediate and low pressure sections of the steam turbine 55. Fully expanded steam is withdrawn from the steam turbine section 55 through an expanded steam pipe 56 and is cooled in a cooler 57 to give water that is settled in a water collection tank 58. Water collected in the tank 58 is withdrawn through line 50 via the heat exchanger 27 where the water is heated against purified exhaust gas, before the water is reintroduced into heat pipe 8.

The first 52 and second 55 steam turbine sections are preferably arranged on a common shaft 80 together with a generator 81 for generation of electrical power. The steam cycle and optimization thereof is well known for people skilled in the art.

Partly expanded steam is withdrawn from the second intermediate pressure steam turbine section 55 through a partly expanded steam pipe 59. The partly expanded steam in pipe 59 is introduced into a humidifier where the steam is cooled by means of water spray introduced from a water pipe 61. The cooled steam is withdrawn from the humidifier 60 through a reboiler steam pipe 62 and is used for indirect heating of lean absorbent in the reboiler 36 to produce vapour from the lean absorbent. Water from condensation of steam introduced into reboiler 36 through pipe 62 is withdrawn through a condensate line 63 and is introduced into the tank 58.

The skilled man will understand that the contact sections mentioned in the present description, such as contact sections 15', 15'', 15''', 19', 19'', 19''', 21', 21'', 21''', 32', 32'', 32''', are contact sections preferably comprising a structured and/or unstructured packing to increase the internal surface area and thus the contact area between liquid and gas in the contact sections.

Figure 2:
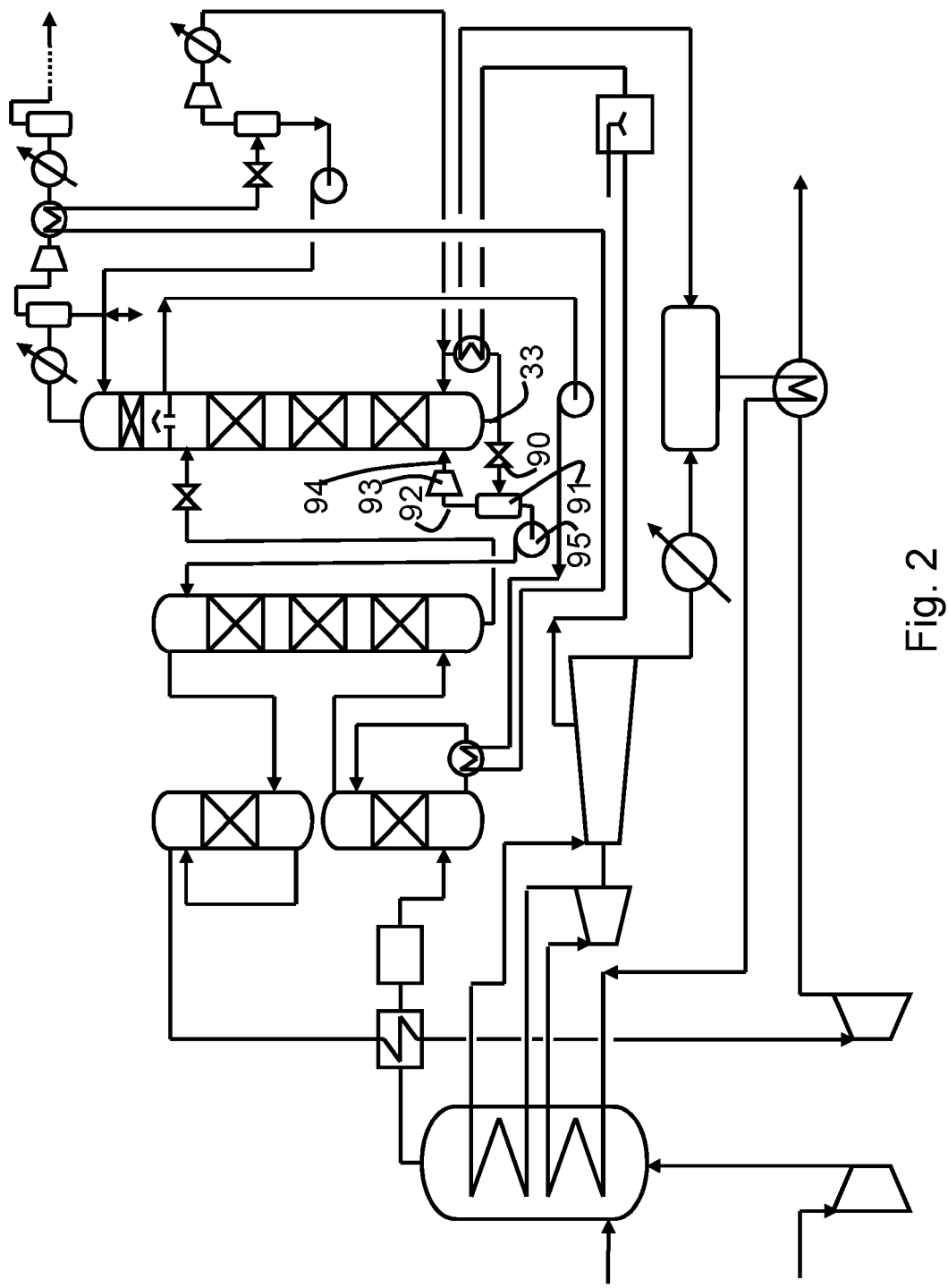
FIG. 2 is a principle drawing of a second embodiment of the invention.

FIG. 2 illustrates a specific embodiment of the present invention giving even higher energy efficiency than the embodiment described with reference to FIG. 1. The only difference between the embodiment of FIG. 2 compared with FIG. 1 relates to flashing of lean absorbent as will be described below. Flashing of lean absorbent as a means for improving energy efficiency is well know per se but not in connection with the heat conservation features as described with reference to FIG. 1.

The part of the lean absorbent leaving the stripper column through line 33 that is to be returned to the absorber 19, is introduced into a flashing valve 90 and then released into a flash tank 91. The gas phase in the flash tank 91 is withdrawn through a steam line 92 and compressed by means of a vapour compressor 93 to compress and thereby heat the vapour. The compressed and heated vapour is then introduced as stripping gas into the stripping column through a compressed steam line 94. The liquid phase collected at the bottom of the flash tank 92 is withdrawn therefrom and pumped into the lean absorbent line 35 by means of a pump 95. In this embodiment, cooler 39 is not used.

EXAMPLE 1

As mentioned above $CO_2$ is absorbed according to equation 1):

$$K_2CO_3 + CO_2 + H_2O \longleftrightarrow 2\ KHCO_3 - \Delta Hrl = -32.29\ \text{kJ/mol CO2)} \quad (1)$$

Equilibrium for the equation is given by the equation 2):

$$K_{eq} = (HCO_3-)^2 / [(CO_3^{2-})PCO_2] \quad (2)$$

Saturation of the absorbent is defined by the equation):

$$s = 2 \times \#mol(KHCO_3) / [\#mol/K_2CO_3) + 2 \times \#mol(KHCO_3)]. \quad (3)$$

In operation of the absorption/desorption plant the targeted saturations are: s=0.30 for lean absorbent (min 0.1) as a higher degree of $K_2CO_3$ regeneration requires extra energy and is normally not required for the $CO_2$ process described above, and s=0.60 (max 0.7) for rich absorbent, as a higher concentration of $KHCO_3$ results in a higher absorbent loading, but may result in the undesirable increase in the crystallization temperature.

The absorber is typically operated at 80 to 110 deg C., whereas the desorber (stripper) is operated at 90 to 120 deg C. dependent on the pressure, typically the temperature in the desorber is 92 deg C. in the top, and 110 deg C. in the bottom due to higher pressure and higher concentration of $K_2CO_3$.

Energy supplied to the desorber for desorption/stripping of $CO_2$ primarily as vapour, is used for:
1. heating of absorbent
2. heating of liquid recycle
3. heat of reaction, even though heat of reaction is very low for some absorbents such as those based on hot potassium carbonate systems.
4. production of stripping vapour (about 0.8 to 1.2 times the mass of $CO_2$ in the top of the desorber, depending on the absorbent properties).

For a coal fired power plant of the pressurized fluidized bed type, coal is fed together with SOx sorbent and typically 25% water to form a paste that is injected into the fluidized bed of the combustion chamber. At a firing rate of 275 LHV lower heating value (LHV), and 282 MW higher heating value (HHV) steam is produced in the heat tubes in the combustion chamber. Typically 86 kg/s steam at about 165 bara and 565 deg C. is generated in the tube 8 and is expanded over steam turbine 52.

The expanded steam is reheated to about 565 deg C. at about 40 bara in heat tube 8' and is expanded over steam turbine 55. Typically, about 18 kg/s steam is withdrawn from the steam turbine stages at various pressures and used for boiler pre-heating. This is not shown in FIGS. 1 and 2 for clarity. In addition, the steam is withdrawn from the steam turbine in line 59 at about 4 bara. The amount of such withdrawal should be minimized. Based on this, the amount of steam that is fully expanded over the steam turbine is 86 kg/s minus about 18 kg/s minus steam flow in line 59. This corresponds to 68 kg/s minus any steam in line 59. The fully expanded steam is withdrawn from turbine 55 through line 56 and recycled as boiler feed water into the heat tube 8, whereas some 12 kg/s steam is partly expanded and withdrawn through pipe 59. The steam withdrawn through pipe 59 has typically a temperature of about 258 deg C and a pressure of 4 bara, but the temperature and pressure may vary depending on the steam turbine system. This steam is cooled in the humidifier 60 to give steam at about 4 bara and 144 deg C. that is introduced into the reboiler of the desorber 36 for indirect heating to produce vapour therein.

The steam withdrawn through line 59 at 4 bara and 258 deg C. could alternatively be expanded to about 0.035 bara at about 27 deg C., to give about 0.7 MJ electrical power per kg expanded steam, assuming steam turbine adiabatic efficiency of 90%. For a 120 MW steam turbine, the steam flow from the 4 bara stage to the condenser is about 68 kg/sec, if the flow in line 59 is zero. The combustor produces about 24.5 kg/s $CO_2$, of which about 22 kg/s is captured (90% capture). When the latent heat required to run the desorber is 3.6 MJ/kg $CO_2$ captured, about 80 MW latent heat is required. The heat content of the 4 bara and 258 deg C. steam, when cooled to saturation temperature at 4 bara and the condensed at 4 bara, is about 2.4 MJ/kg. The required amount of steam from the steam turbine is therefore about 80/2.4 kg/s, or about 34 kg/s. The loss of power from the steam turbine is then 34*0.7 MW or about 24 MW.

On the cold side of the stripper reboiler 36, the pressure is slightly above atmospheric. Therefore, the product produced from the steam extracted from the steam turbine is now steam at, for example 1.2 bara at a temperature of about 110 deg C. which is the boiling point of the lean absorbent at this pressure.

Under the same assumption as above, i.e. that 22 kg/s $CO_2$ is stripped off of the absorbent, the energy required is 3.6 MJ/kg $CO_2$ or about 80 MW latent and sensible heat. This corresponds to about 34 kg/h steam flow to the bottom of the desorber, produced in the reboiler.

Of this, about 12 kg/s is condensed to supply heat to items 1) to 3) above. The rest, about 22 kg/s, is used as stripping steam, item 4). This steam exits the top of the desorber packings together with the recovered $CO_2$. This means that the energy used for stripping is essentially the energy lost by diluting the stripping steam with $CO_2$. 22 kg/s $CO_2$ mixed with 22 kg/s H2O means that there is about 70 mole % $H_2O$. So the $H_2O$ partial pressure is reduced from slightly above 1 bara in the bottom of the desorber to about 0.7 bara in the top (corresponding to $H_2O$ dew point of about 90 deg C. when the total pressure is 1.0 bara). In practice, this steam is condensed to obtain the $CO_2$, and the latent heat of the stripping steam is therefore lost, which is a much larger loss than the loss associated with the reduction in partial pressure of the stripping steam by dilution with recovered $CO_2$. It is desirable to preserve this latent heat, and only supply energy to compensate for the loss of stripping steam partial pressure.

Figure 3:
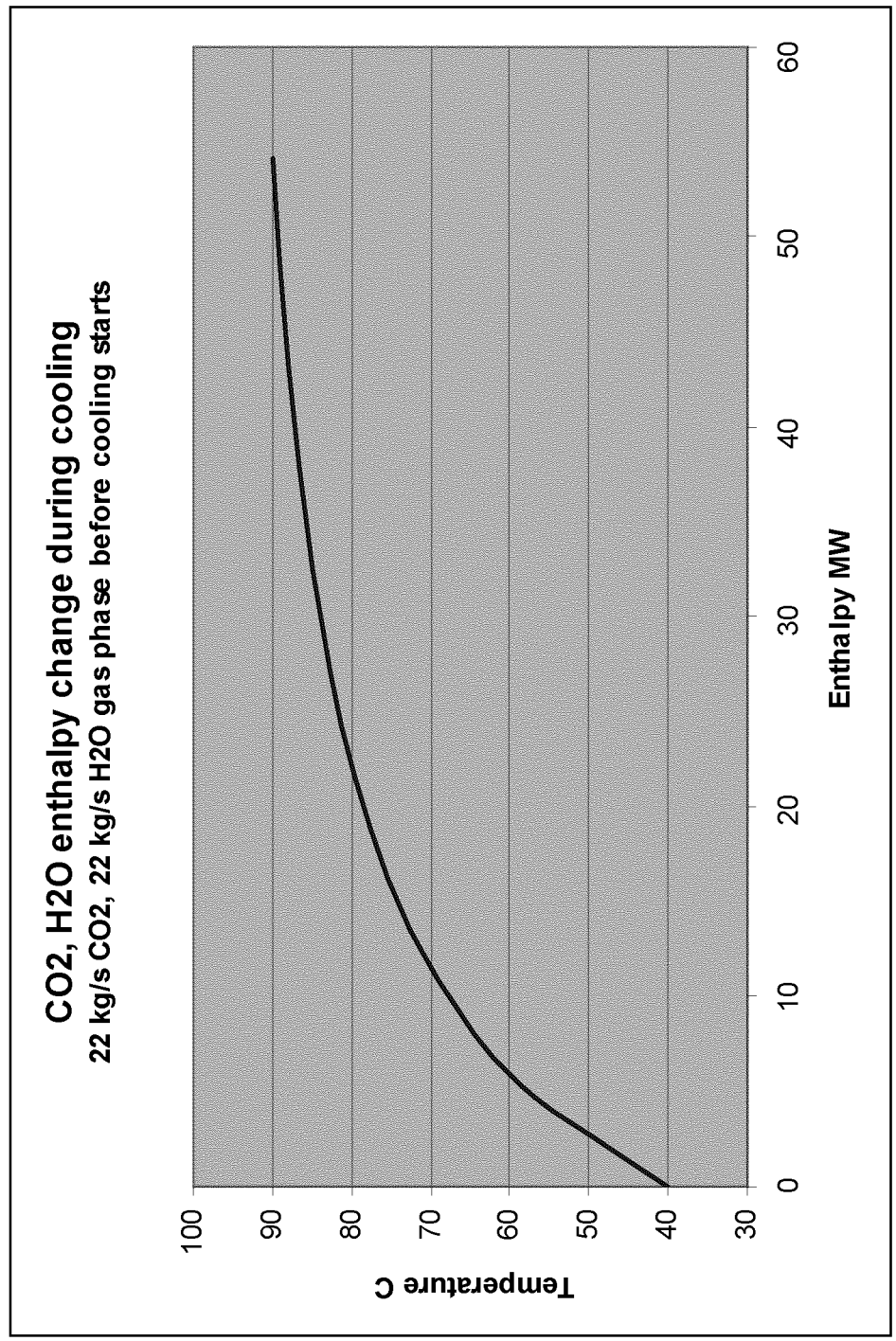
FIG. 3 is a diagram illustrating the enthalpy change versus temperature for $CO_2/H_2O$ during cooling.

The enthalpy change from the condensation of stripping gas vs condensation temperature is shown in FIG. 3. As water is condensed, the partial pressure of water vapour is reduced, and a lower temperature is required for further condensation. Therefore, to recover additional heat in the direct contact cooler section 66 of the stripper, cooling water from flash tank 74 via line 78 and pump 79 needs to be colder. This reduces the pressure in flash tank 74 and therefore the work required by compressor 75. If less heat is recovered from the direct contact cooler section 66 and the difference is supplied by a higher temperature separate heat source, then the temperature in flash tank may be higher. This also gives a higher pressure and less work required by compressor 75.

According to FIG. 3, recoverable heat in the range 80 to 90 deg C. amounts to about 28 MW that may be recovered from the desorber direct contact cooler section 66 in the washing water withdrawn through pipe 70.

The heat energy recovered in the desorber direct contact cooler 66 is an important source for recovering heat in the present process. The $CO_2$/steam to be withdrawn from the desorber/stripper is cooled by direct contact cooling against water. Due to the cooling, steam in the steam saturated gas is condensed, and thus separating water vapour from the desired product which is $CO_2$.

Figure 4:
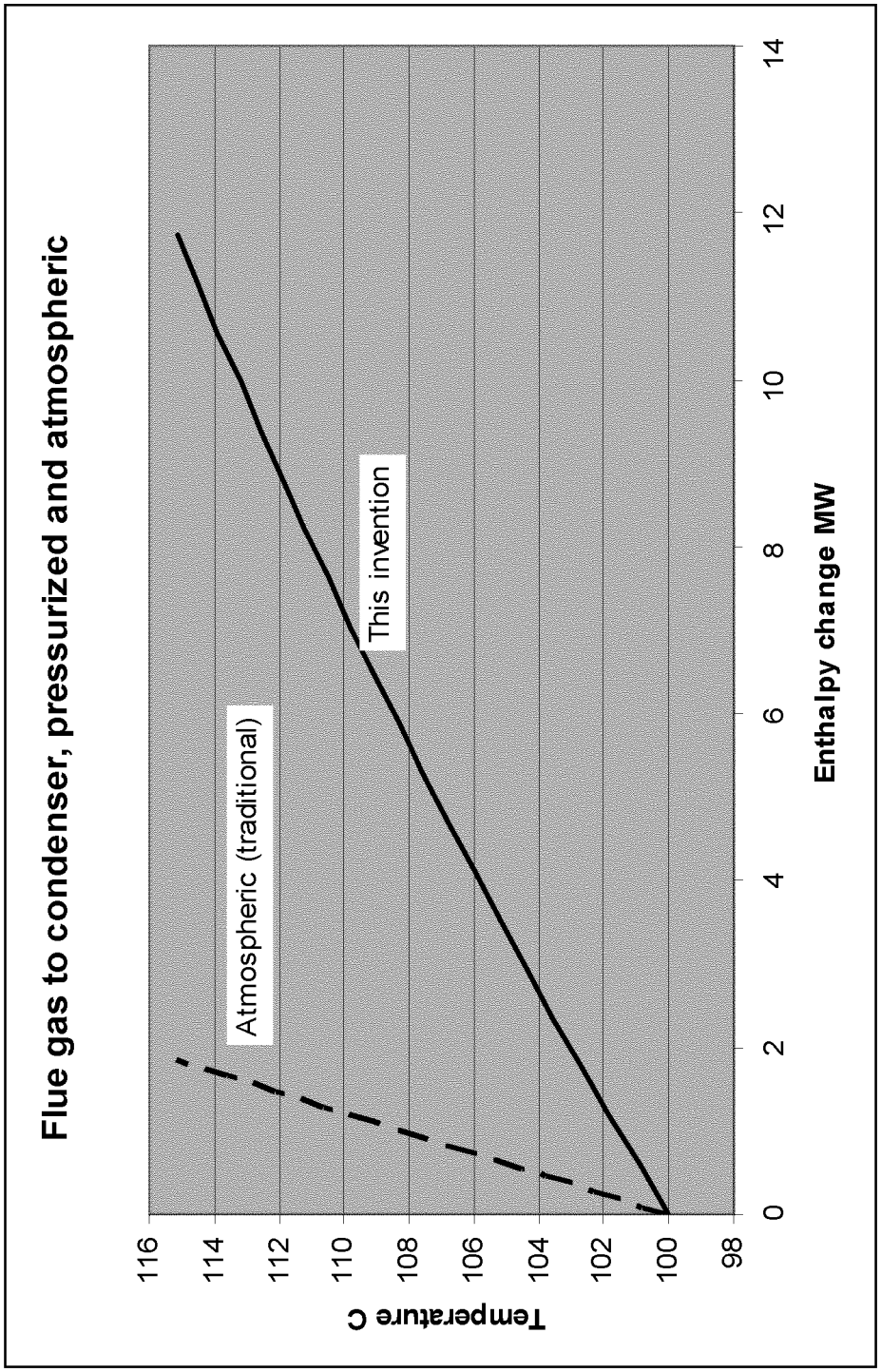
FIG. 4 is a diagram illustrating the enthalpy change versus temperature for flue gas comparing an atmospheric plant to a pressurized plant.

Another important source for recoverable heat is the flue gas direct contact cooler 15. Flue gas enters the flue gas direct contact cooler 15 at a temperature of about 115 to 120 deg C. It contains water vapour from the combustion process, either from combustion of hydrogen which is part of the gas, oil, coal or bio fuel, or from the fuel feed system such as coal which may be fed into the combustor 2 as a water paste. The water vapour saturation temperature depends on the amount of water vapour and on the pressure. With coal fuel fed into the combustor as paste and pressure about 12 to 13 bara, the flue gas saturation temperature is about 115 deg C. If natural gas fuel is used, the amount of water vapour is higher and the saturation temperature will be higher. If the pressure is lower, the saturation temperature will be lower. Due to the fact that the flue gas is at an elevated pressure and contains significant amounts of steam, the condensation of the steam will start at the saturation temperature which is relatively high, resulting in a substantial amount of recoverable high temperature energy in the form of heat. FIG. 4 is an illustration on the effect of pressure on the amount of high temperature recoverable heat when flue gas is cooled. The curve is made under the assumptions of a flue gas flow of 111 kg/s where the flue gas inlet temperature of 115 deg C., and flue gas outlet temperature of 100 deg C., and a flue gas water content of 14.5%.

The difference between atmospheric (traditional) systems and the system according to the present invention, is the water vapour condensation in the pressurized system. An atmospheric system has much lower $H_2O$ partial pressure even though the amount of $H_2O$ vapour might be the same, and therefore the cooling of the flue gasses produce no condensate, resulting in far less energy recuperation.

According to the present invention, the flue gas is cooled to about 100 deg C. in the condenser, which is preferably implemented as a direct contact cooler where the flue gas flows over a packing in counter-current to circulating water. This water captures the energy in the gas and is cooled in the heat exchanger 17 which receives cooling water from the desorber direct contact cooler, further heating this water and supplying more energy.

The dotted curve in FIG. 4 is for comparison only, showing one advantage with this system, over more traditional atmospheric $CO2$ capture systems where very little useful energy (energy above 100 deg C. in this case) would be obtained from the same flue gas.

A third source of heat energy recovery is $CO_2$ compressor cooler(s) 48. The amount of available energy in the compression cooler(s) is lower than in the coolers mentioned above but the temperature is higher.

Table 1 illustrates the net power generated by the present power plant with $CO_2$ capture as a function of steam produced by means of the present heat regeneration in the flue gas direct contact cooler 15 (in the table identified by "Condenser"), in the desorber direct contact cooler section 66 (in the table identified by "Desorber", and the compressor intercooler(s) 48 (in the table identified by "Compressors").

TABLE 1

| Steam produced | Heat source for steam production | | | | | | |
|---|---|---|---|---|---|---|---|
| (flash tank 74) kg/s | Desorber cooler 66 MW | Condenser cooler 17 MW | Compressor coolers 48 MW | 4 bar steam* kg/s | Steam turbine MW | Flash compressor MW | Net power MW |
| 0 | — | — | — | 34 | 96 | — | 96 |
| 10 | 5 | 11 | 6 | 24 | 103 | −1.1 | 101.9 |
| 15 | 16 | 11 | 6 | 19 | 106.5 | −2.2 | 104.3 |
| 20 | 28 | 11 | 6 | 14 | 110 | −3.6 | 106.4 |
| 25 | 39 | 11 | 6 | 9 | 113.5 | −6.4 | 107.1 |

*Steam turbine side draw. With zero side draw, the steam turbine output is about 120 MW.

Table 1 clearly illustrates the increase in net power from the steam turbine as a result of increasing heat recovery from said three elements of the plant, and illustrates the most important advantages of the present invention.

The net power, steam turbine output minus flash compressor power, increases by more than 10 MW when 20 kg/s steam is produced and compressed by the invention and routed to the bottom of the desorber, replacing the same amount of 4 bara steam from the steam turbine.

Further increase in the steam production by flash and compression, to for example 25 kg/s, requires large increase in the flash compressor duty, and the increase in net power is much smaller. Production beyond 25 kg/s gives no or negative contribution to the net steam turbine output minus flash compressor duty.

EXAMPLE 2

This example illustrates the additional effect of the flashing and compression and injection of the steam from flash tank 81 into the regenerator column as stripping gas, as illustrated with reference to FIG. 2.

Figure 5:
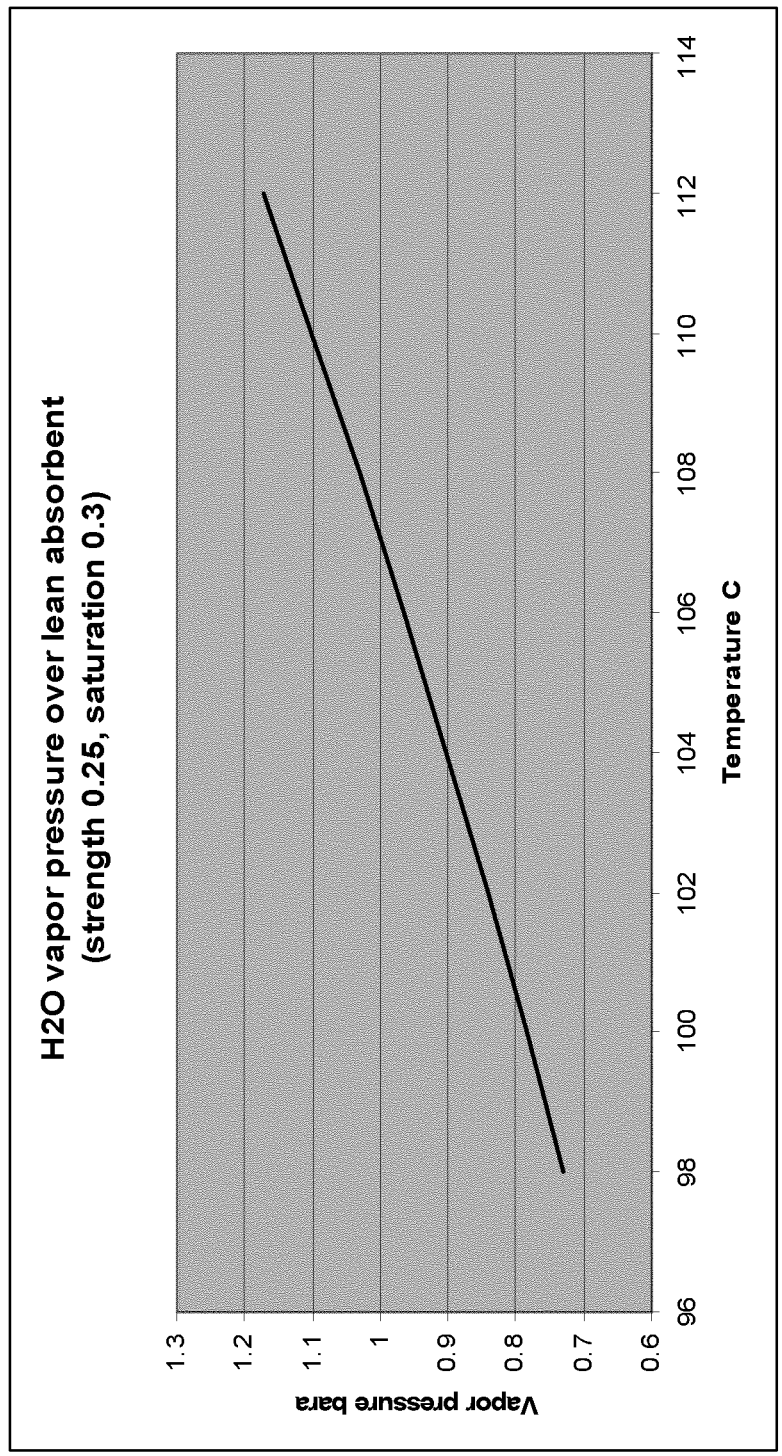
FIG. 5 is a diagram illustrating temperature versus vapour pressure for $H_2O$ over lean absorbent.

FIG. 5 illustrates the vapour pressure of the lean absorbent as a function of temperature at about 100 deg C. The heat capacity of the lean absorbent is about 3.0 kJ/kg-K With lean absorbent flow of 1000 kg/s and cooling from about 112 deg C. (the approximate temperature at the bottom of the desorber) to about 98.6 deg C. (the approximate lean absorbent feed temperature to the top of the absorber), about 1000*3.0* (112−98.6) kW=40000 kW is produced With CO2 production of 22 kg/s and total desorber heat requirement, in the form of latent heat in steam, of 3.6 MJ/kg CO2, the total heat requirement is about 80 MW. Hence the lean flash can produce about 50% of this heat.

With steam latent heat of about 2250 kJ/kg (at about 1.2 bara) this corresponds to about 17.8 kg/s steam. This must be compressed from about 0.75 bara to about 1.2 bara. The compressor duty is then about 2.0 MW, assuming an adiabatic efficiency of 80%.

Table 2 summarizes the effect on flashing the lean absorbent on the total output from the steam turbine.

TABLE 2

| Steam source | Flash steam kg/s | Flash steam latent heat MW | Flash steam compressor MW | 4 bara steam* kg/s | Steam turb power MW | Net power MW |
|---|---|---|---|---|---|---|
| Steam turb | 0 | 0 | 0 | 34 | 96 | 96 |
| This inv. | 17.8 | 40 | −3.0 | <1 | 120 | 115 |
| Lean flash | 17.8 | 40 | −2.0 | | | |

*Steam turbine side draw. With zero side draw, the steam turbine output is about 120 MW.

Table 2 clearly illustrates that the flash of the lean absorbent on the total output from the steam turbine. Combination of the energy features of example 1, the net power may be increased from 96 MW to 115 MW compared to 120 MW without carbon capture.

The fact that the heat of reaction for equation 1) is relatively low is an advantage for potassium carbonate systems as the corresponding exothermal heat of reaction in the absorber is low and thus the heating of the absorbent in the absorber. Heating of the absorbent in the absorber can shift the reaction to the left and thus reduce the absorption capacity of the absorbent.

The invention claimed is:

1. A method for power production by combustion of carbonaceous fuels and $CO_2$ capture, where the carbonaceous fuel is combusted in a combustion chamber under pressure in presence of gas containing oxygen, where the combustion gas is cooled in the combustion chamber by generation of steam inside heat pipes provided in the combustion chamber, where the exhaust gas is withdrawn from the combustion chamber through an exhaust gas pipe via heat exchanger(s) and exhaust gas treatment units, and a direct contact cooler connected to a water recycle pipe for recirculation of water collected at the bottom of the direct contact cooler and reintroduction of the water at the top of the cooler, in which cooler the partly cooled exhaust gas is further cooled and humidified by counter-current flow to water, where the exhaust gas is withdrawn from the direct contact cooler through a cleaned exhaust pipe and is introduced into a $CO_2$ absorber, into which absorber lean absorbent is introduced above an upper contact zone in the absorber, to cause the exhaust gas to flow counter-current to a liquid $CO_2$ absorbent to give a rich absorbent that is collected at the bottom of the $CO_2$ absorber and is withdrawn therefrom in a rich absorbent pipe, and a $CO_2$ lean exhaust gas that is withdrawn from the top of the absorber through a lean exhaust pipe connected to the absorber, where the lean exhaust gas is washed in a washing section, heated in a heat exchanger and expanded over a turbine for generation of electrical power before being released into the atmosphere; where the rich absorbent pipe is connected to introduce the rich absorbent into stripping column for regeneration of the absorbent to give a lean absorbent that is withdrawn through a lean absorbent recycle line in which the lean absorbent is pumped back to into the absorber, and a $CO_2$ stream that is further treated to give clean $CO_2$;

wherein the $CO_2$ stream is cooled against cooling fluid flowing through the direct contact cooler direct contact cooler provided at the top of the stripping column; and wherein water is collected at a collector plate provided below the direct contact cooler, and where a water recycle line is arranged to withdraw the collected water, wherein the circulating direct contact cooler cooling water in the recirculation pipe is cooled in a heat exchanger provided in the recirculation pipe, where cooling water is delivered and withdrawn, respectively, through water recycle pipes connected to the heat exchanger, and where the water withdrawn from the heat exchanger through recycle line is flashed over a flash valve and a flash tank, where water from the flash tank is withdrawn through a line to recycle the water as washing liquid in the stripping column direct contact cooler; and wherein the vapour in the stripping tank is introduced as additional stripping vapour in the stripping column through a vapour line connected to the flash tank.

2. The method according to claim 1, wherein the fluid in pipe is heated in a heat exchanger provided to cool compressed $CO_2$ and steam, before the fluid in pipe is introduction of flashed over flash valve.

* * * * *